Jan. 6, 1959 A. J. BENT 2,867,240
PULSATION DAMPENER DEVICE
Filed Jan. 30, 1956
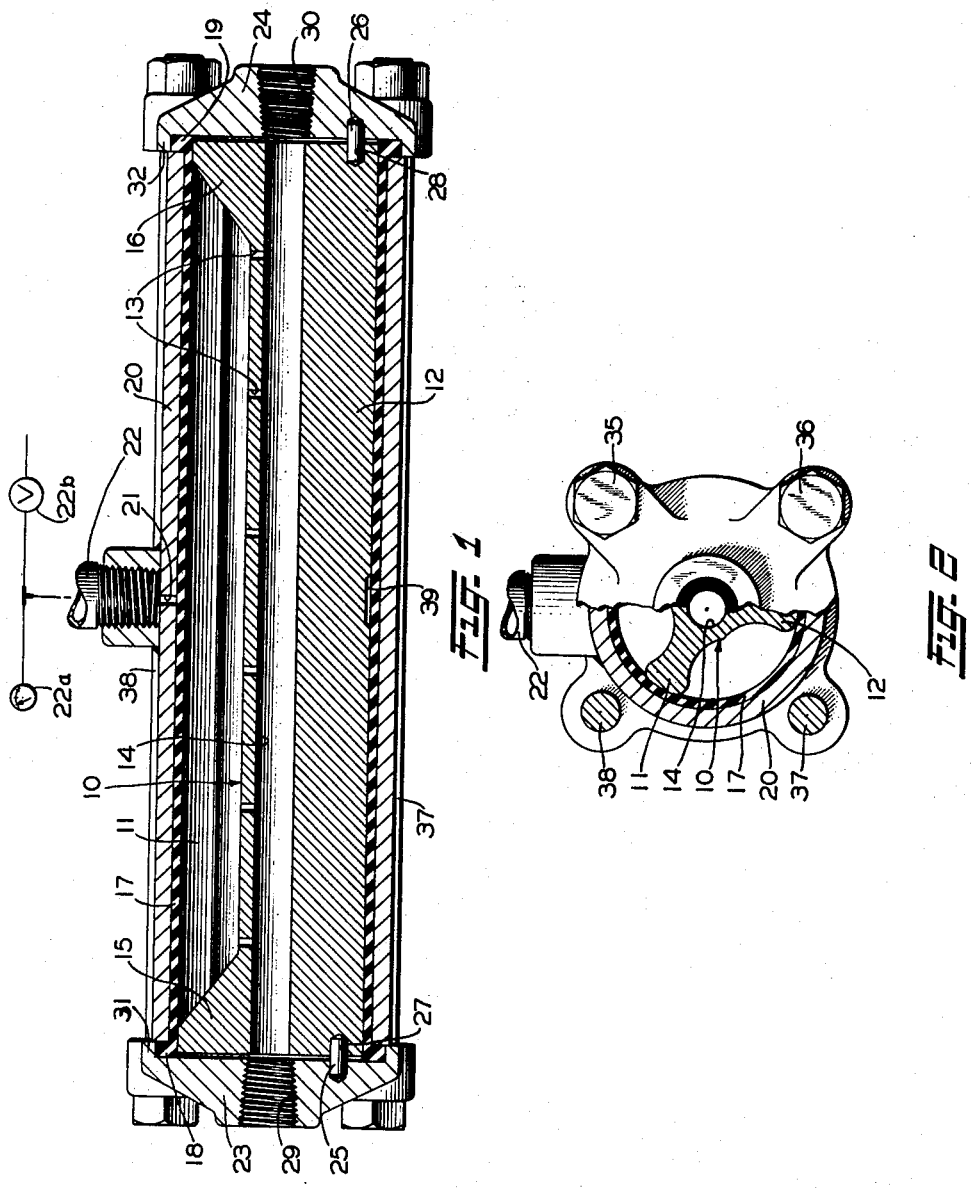
INVENTOR.
Arthur J. Bent
BY
Aelbert A. Steinmiller
Attorney United States Patent Office 2,867,240
Patented Jan. 6, 1959

2,867,240

PULSATION DAMPENER DEVICE

Arthur J. Bent, Pittsburgh, Pa., assignor to Westinghouse Air Brake Company, Wilmerding, Pa., a corporation of Pennsylvania Application January 30, 1956, Serial No. 562,188

2 Claims. (Cl. 138—30)

This invention relates to devices for dampening, absorbing, and suppressing undesired pressure pulsations or surges in fluid systems, and more particularly to such devices of the type employing a mandrel and resilient means associated therewith and adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps having an output which is usually characterized by low cycle or low frequency surges of high volume or intensity; centrifugal and rotary pumps may have in their fluid output low volume surges occurring at a high frequency. In addition to these periodic surges, shock waves may be generated in any fluid flow system where the fluid is subject to sudden deceleration, such for example as that caused by closing a valve against a moving column of fluid. The closing of such a valve may result in the generation of surges or shock waves of high intensity, which may result in damage to pipe lines and undesirable noises frequently known as "water hammer."

It is old in the art to suppress and dampen these surges and shock waves by connecting in the fluid line a mandrel or section of pipe having therein a number of perforations or throttling orifices, this perforated section of pipe or mandrel being surrounded by a resilient sleeve of rubber or other suitable resilient material. Sudden surges and increases of pressure in the fluid in the line cause the fluid to flow through the perforations into the space between the sleeve and the line or mandrel, thereby taking up or absorbing the excess pressure. When the pressure in the line returns to normal after the surge is passed, the fluid between the sleeve and the line is discharged through the openings or perforations back into the line. In some prior art devices, the sleeve itself is surrounded by a chamber of resilient material, such for example as air under pressure, to insure the rapid collapse of the sleeve or return to its former position, and discharge of fluid back into the line when the line pressure falls to normal or below after the surge has passed.

It has been found that the useful life of resilient sleeves in such devices is limited by the wear resulting from contact and friction between the sleeve and pipe section, and also to some extent when the sleeve is too greatly distended by fluid pressure in the line. Also, sharp folds in the sleeve may occur when it collapses after being stretched, the sharp folds resulting in ultimate rupture of the sleeve.

The apparatus of the instant invention overcomes these and other disadvantages of the prior art by providing an arrangement wherein substantial changes in the volume between the sleeve and mandrel may occur without substantial stretching of the sleeve. This is accomplished by employing a mandrel which has a configuration such that when the rubber sleeve collapses the contact area between the rubber sleeve and the mandrel is approximately the same as the contact area between the rubber sleeve and the wall of the casing which surrounds the sleeve and provides a housing for compressed air, which assist the sleeve in the discharge of fluid back into the line after the surge has passed. The mandrel is so constructed that the ends taper toward the middle to form a fingered support. The supports or fingers are connected by smooth radii. The connecting ports or throttling orifices from the inside of the mandrel are disposed in these smooth radii connecting surfaces. The resilient sleeve is not unduly stretched and is not permitted to fold when it collapses on the mandrel, thereby providing a longer life for the rubber sleeve.

Accordingly, it is a primary object of this invention to provide new and improved surge absorbing and pulsation dampening apparatus characterized by long and trouble-free life.

Another object is to provide new and improved surge absorbing apparatus of the type employing a resilient sleeve in which wear of the sleeve is reduced to a minimum.

Another object is to provide new and improved surge absorbing apparatus of the type employing a resilient sleeve supported by a mandrel in which frictional contact between the sleeve and mandrel is reduced to a minimum.

Still another object is to provide new and improved surge absorbing apparatus of the type employing a resilient sleeve supported by a mandrel in which the volume between the sleeve and mandrel may vary within wide limits without excessive stretching of the sleeve.

A further object is to provide a new and improved mandrel for use in surge absorbing apparatus of the type employing a resilient sleeve supported by a mandrel.

Still a further object is to provide a new and improved mandrel for use in surge absorbing and pulsation dampening apparatus of the type employing a resilient sleeve supported by mandrel in which the mandrel is so shaped as to eliminate sharp folds and creases in the resilient sleeve.

Other objects and advantages will become apparent after a perusal of the following specifications when studied in connection with the accompanying drawings, in which:

Fig. 1 is a sectional view of the pulsation dampener apparatus substantially along the longitudinal axis thereof; and Fig. 2 is an end view of the apparatus of Fig. 1 as seen from the left end, with a portion broken away.

Referring now to the drawings for a more detailed understanding of the invention and in which like reference numerals are used throughout to designate the like parts, there is shown a mandrel generally designated by the reference numeral 10. The mandrel 10 has three ridges, lobes or "fingers" running longitudinally thereof, two of these ridges or lobes being designated 11 and 12. Disposed between the three lobes or ridges are three rows of throttling orifices, one of said rows of throttling orifices being designated 13 and shown in Fig. 1. These orifices communicate with the central bore 14 of the mandrel and permit fluid in the bore of the mandrel to flow therethrough, for reasons to be hereinafter apparent. The mandrel 10 has end portions 15 and 16, and the mandrel has disposed therearound a resilient sleeve 17 composed of rubber or other suitable material and having two flanged ends 18 and 19. Disposed around the outside of the sleeve 17 is a hollow cylindrical-shaped housing member 20 having a bore 21 therein communicating with a pipe 22. It is to be understood that the pipe 22 is provided for bringing fluid under pressure, for example, compressed air into the pulsation dampening apparatus, and there may be connected to pipe 22 a pressure gauge 22a and a valve 22b for admitting compressed air and for closing off the air circuit when the desired pressure has been applied. Upon the admission of compressed air the sleeve 17 is pressed downwardly between the lobes or ridges of the mandrel 10.

Disposed adjacent the ends 15 and 16 of mandrel 10 are two end pieces 23 and 24 respectively having therein pins 25 and 26 respectively which extend into bores 27 and 28 of the mandrel ends 15 and 16 respectively for holding the mandrel in a predetermined position inside the casing 20. The end pieces 23 and 24 have threaded bores 29 and 30 therein respectively for connecting with the pipe carrying the fluid from which pulsations are to be removed.

Whereas for convenience of illustration the embodiment of the apparatus is shown in which fluid flows through the dampening apparatus, it is to be understood that one of the end pieces 23 or 24 could if desired be made solid without a threaded bore therein and the other end piece connected to the fluid pipe line by, for example, a T-joint.

The end pieces or end plates 23 and 24 have overhanging annular lips 31 and 32 respectively, the overhanging annular lips being adapted to receive the aforementioned flanged ends 18 and 19 of the resilient sleeve 17. The aforementioned end pieces 23 and 24 have a plurality of bores therein respectively for receiving bolts 35, 36, 37 and 38 which extend the length of the apparatus and which firmly secure the end plates 23 and 24 to each other and compress the aforementioned flanged ends of the resilient sleeves 17 to provide a sealed engagement between the sleeve and the mandrel ends 15 and 16 and further to provide a seal between the ends of the sleeve and the adjacent ends of the cylinder 20.

Each lobe or ridge has a groove 39 therein to provide an easy pathway for the flow of fluid between the various portions of the apparatus, and to facilitate the movement of compressed air around the outside of the sleeve 17 by providing recesses into which the compressed air may force the sleeve and obtain free passageways for itself, so that the pressure of the compressed air on the outside of the sleeve may become substantially equalized over the entire area. Obviously, the casing might have a circumferential groove (not shown) on the inside thereof to perform a function similar to that of the grooves in the ridges.

In the operation of the aforedescribed apparatus, preferably the dampener is precharged prior to use by admitting compressed air into the cylinder 20 through aperture 21. This compressed air forces the resilient sleeve 17 down between the lobes or ridges of the mandrel and forms a chamber between the inside wall of cylinder 20 and the outside of the sleeve 17. In use, surges and pulsations of pressure in the fluid in the central bore 14 force fluid to flow through the apertures 13 into the volume between the sleeve 17 and mandrel 10 forcing the sleeve back against the pressure of the compressed air. When the surges and pulsations have subsided and the pressure in the fluid in bore 14 returns to normal, the compressed air in the aforementioned chamber formed by housing 20 forces fluid back through the orifices 13 into the bore 14. Substantial changes in the volume between the sleeve 17 and mandrel 10 may occur without excessive stretching of the sleeve 17, and when the sleeve 17 is forced inward toward the connecting surfaces between the lobes of the mandrel, with which it may make contact, sharp folds in the sleeve are eliminated because the sleeve follows the smooth contours of the lobes.

Whereas the invention has been shown and described with respect to a mandrel having three lobes or ridges it is to be understood that the invention is not limited to a device having three lobes but that any convenient number could be employed. Any convenient number and shape of throttling orifices may be employed and the invention is not to be limited to the use of circular apertures arranged in rows. Furthermore, any convenient ratio may be employed between the total area of the throttling orifices and the area of the bore 14 and the pipe line carrying the fluid from which surges are to be removed.

Having now described the invention, what I claim as new and desire to secure by Letters Patent, is:

1. A pulsation dampening apparatus for absorbing pressure surges in a fluid conveying conduit, said apparatus comprising a mandrel having a tubular portion for fluid pressure communication with the conduit and a plurality of longitudinally extending ridge-like projections uniformly spaced about and joined to the exterior of said tubular portion, a resilient sleeve surrounding said mandrel for defining respective chambers between said sleeve and said ridge-like projections, said tubular portion having a plurality of orifices via which each of said respective chambers is open to the conduit, housing means having a bore concentrically surrounding said sleeve and defining between said bore and sleeve another chamber charged with gas at a preselected pressure, and means providing flow paths whereby the gas in said other chamber may flow around the outside of said resilient sleeve, said sleeve being secured adjacent its respective ends in sealed relation to said housing means and mandrel for sealing off said respective chambers from said other chamber, the outer circumference of said sleeve being substantially equal to the circumference of said bore, and the perimeter of said mandrel including the ridge-like projections thereof being substantially equal to the inner circumference of said sleeve.

2. A pulsation dampening apparatus for absorbing pressure surges in a conduit conveying fluid at fluctuating pressures, said apparatus comprising, in combination, a generally tubular mandrel having a coaxially arranged opening, a plurality of restricted throttling orifices extending generally radially therethrough and communicating with said opening, and a plurality of ridge-like projections uniformly spaced about and joined to the exterior of said mandrel and extending in a direction parallel to the axis of said opening, housing means connectable to the conduit and having a mandrel-encircling bore and also having aperture means via which said opening has fluid pressure communication with the conduit, resilient sleeve means sealingly secured adjacent its respective ends between said mandrel and housing means and constantly engaging the outermost parts of each of said ridge-like projections and the portions of said bore radially outward of said parts, said resilient sleeve means cooperating with the exterior of said mandrel to define between said ridge-like projections respective chambers open to the conduit via said orifices and opening, said resilient sleeve means cooperating with said bore to define another chamber, valved inlet means associated with said housing means for charging said other chamber with gas at a preselected pressure, and means providing flow paths whereby the gas in said other chamber may flow around the outside of said resilient sleeve means, the outer circumference of said resilient sleeve means being substantially equal to the circumference of said bore, and the perimeter of said mandrel including the ridge-like projections thereof being substantially equal to the inner circumference of said resilient sleeve means.

References Cited in the file of this patent

UNITED STATES PATENTS

| | | |
|---|---|---|
| 2,583,231 | Ragland | Jan. 22, 1952 |
| 2,712,831 | Day | July 12, 1955 |
| 2,760,518 | Peet | Aug. 28, 1956 |